United States Patent [19]
Sano

[11] Patent Number: 6,022,272
[45] Date of Patent: *Feb. 8, 2000

[54] SLIDING SIMULATOR AND GAME APPARATUS USING THE SAME

[75] Inventor: Takashi Sano, Yokohama, Japan

[73] Assignee: Namco Ltd., Tokyo, Japan

[*] Notice: This patent is subject to a terminal disclaimer.

[21] Appl. No.: 08/979,845

[22] Filed: Nov. 26, 1997

Related U.S. Application Data

[63] Continuation of application No. 08/665,289, Jun. 17, 1996, Pat. No. 5,713,794.

[30] Foreign Application Priority Data

Jun. 22, 1995 [JP] Japan .................................. 7-180998

[51] Int. Cl.[7] .............................................. A63B 69/18
[52] U.S. Cl. .............................. 463/36; 463/32; 434/253; 482/70; 482/902
[58] Field of Search .............................. 463/6–7, 30–32, 463/36; 434/247, 253, 307 R; 482/1–9, 51, 70–71, 79, 901, 902; 273/440–441, 445, 449, 460, 461; 364/410.1; 700/90

[56] References Cited

U.S. PATENT DOCUMENTS

| | | | |
|---|---|---|---|
| 3,159,400 | 12/1964 | Brass et al. | 434/253 |
| 3,408,067 | 10/1968 | Armstrong | 434/253 |
| 4,629,181 | 12/1986 | Krive | 482/901 |
| 4,817,950 | 4/1989 | Goo | 463/36 |
| 4,869,496 | 9/1989 | Columbo | 434/253 |
| 4,906,192 | 3/1990 | Smithard et al. | 434/253 |
| 5,049,079 | 9/1991 | Furtado et al. | 434/253 |
| 5,192,258 | 3/1993 | Keller | 482/71 |
| 5,429,562 | 7/1995 | Milner | 482/51 |
| 5,713,794 | 2/1998 | Shimojima et al. | 463/36 |

*Primary Examiner*—Valencia Martin-Wallace
*Assistant Examiner*—Mark A. Sager
*Attorney, Agent, or Firm*—Oliff & Berridge, PLC

[57] ABSTRACT

A sliding simulator includes swinging member. The swinging member is swung right and left by a player standing thereon. A swing sensor senses swing movement of the swinging member. An image generating unit generates an image in response to a signal sensed by the swing sensor. The image is displayed on a display.

21 Claims, 21 Drawing Sheets

6,022,272

SLIDING SIMULATOR AND GAME APPARATUS USING THE SAME

This is a Continuation of Application Ser. No. 08/665,289 filed Jun. 17, 1996 now U.S. Pat. No. 5,713,794.

BACKGROUND OF THE INVENTION

1. Field of the Invention

The invention relates to a sliding simulator and a game apparatus using such a sliding simulator.

2. Description of Related Art

A skiing simulator system in which a player stands on boards similar to ski plates to play a pseudo-skiing is known.

However, such a skiing simulator system could not simulate the actual skiing action and have less reality.

SUMMARY OF THE INVENTION

An object of the invention is to provide a sliding simulator capable of providing a sliding action very similar to the actual sliding action and a game apparatus using such a sliding simulator.

The sliding simulator of the invention comprises a swinging member. The swinging member is swung right and left by a player standing thereon. A swing sensor senses swing movement of the swinging member. An image generating unit generates an image in response to a signal received from the swing sensor. The image is displayed on a display.

According to the invention, a player may obtain an actual sliding feeling depending upon the setting of the device.

With the sliding simulator, the swinging member can have a pair of steps and an edging sensor. Each of said steps is designed for the player's standing thereon with each of the player's feet. Each of the steps is rotatably supported along an access extending behind and in front of said player. When the steps are inclined by the player, the player can perform an edging action. The edging action is accomplished above the step rotating shafts within the maximum inclination angle from a reference position in which the inclination angle is equal to zero. The edging sensor senses this inclination angle. A signal sensed by the edging sensor is inputted into the image generating unit and is used as part of information for generating the image.

According to this, the player can feel a sense further similar to the actual sliding sense by edging action through rotating the steps.

With the sliding simulator of the invention, the steps can be interlocked to be made parallel.

The sliding simulator of the invention may comprise a support means grasped by said player to support the player with the player's hands.

With the sliding simulator of the invention, the image may be a three-dimensional image.

The game apparatus of the invention comprises the sliding simulator of the invention for playing a skiing game.

BRIEF DESCRIPTION OF THE DRAWINGS

The invention is described in detail with reference to the following drawings, wherein.

DETAILED DESCRIPTION OF THE PREFERRED EMBODIMENTS

Some preferred embodiments of the invention will now be described in detail with reference to the drawings. FIGS. 1 to 8B show the distinctive structure of one embodiment to which the invention is applied. Prior to the detailed description of such an embodiment, the overall structure thereof will be described with reference to FIGS. 9 to 11.

Overall Structure

Figure 9:
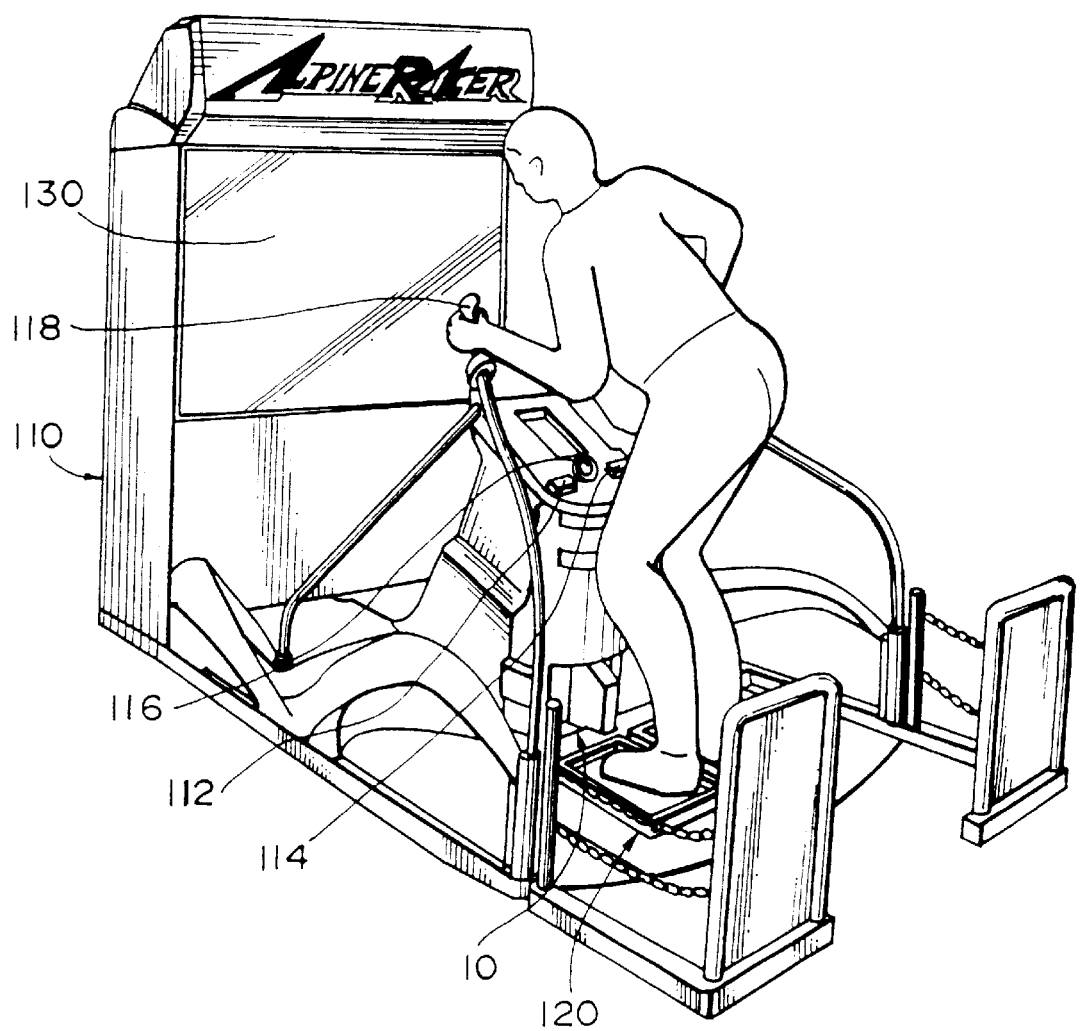
FIG. 9 is a perspective view of a ski game apparatus.
Figure 10A:
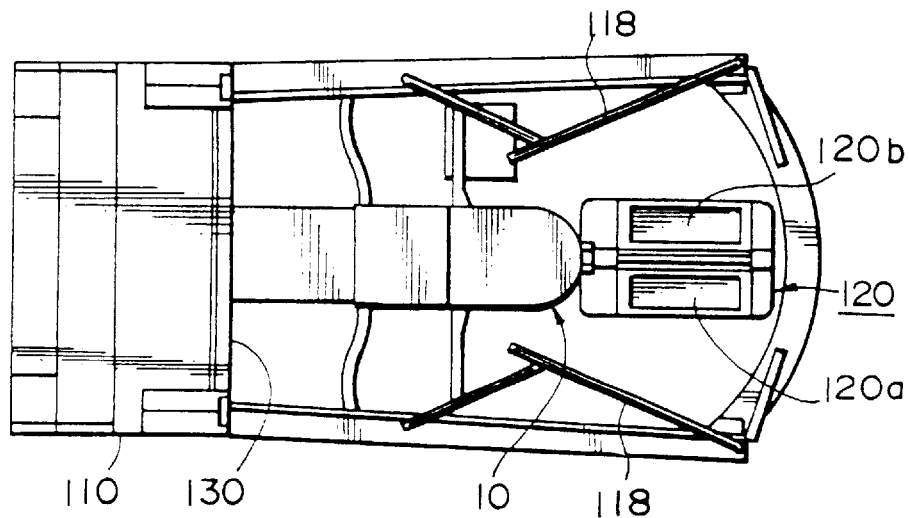
FIGS. 10A and 10B show plan and side views of the ski game apparatus.
Figure 10B:
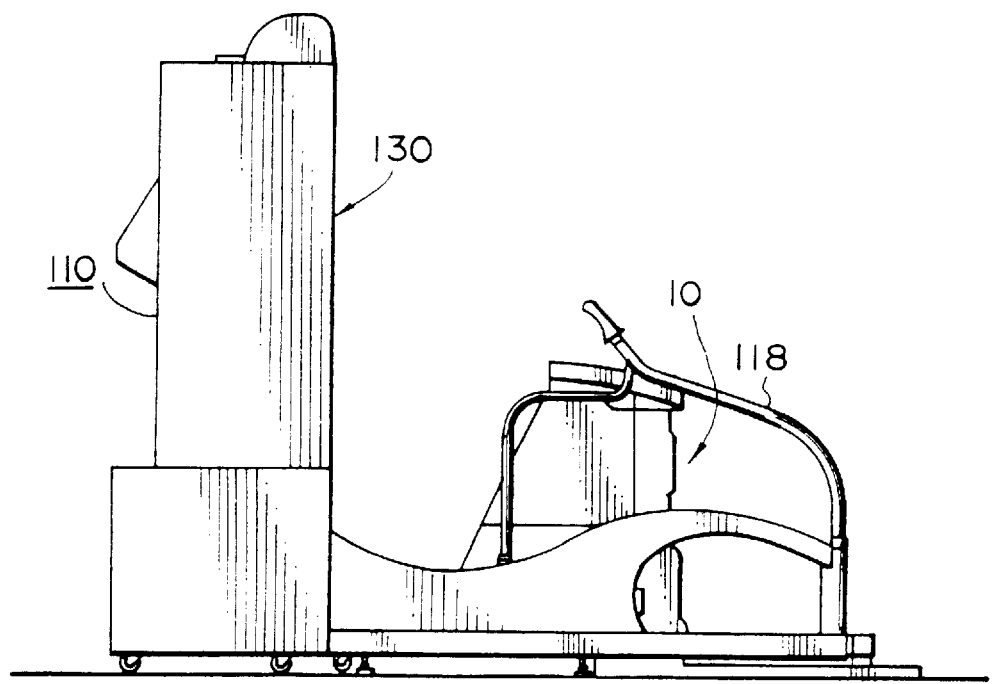

FIG. 9 shows a preferred arcade ski game apparatus to which the invention is applied. FIG. 10A is a plan view of such a ski game apparatus while FIG. 10B is a side view of the ski game apparatus.

The illustrated ski game apparatus comprises an input board 120 imitating actual ski plates and a display 130 located in front of the input board 120. Two ski sticks 118 imitating actual ski sticks are fixedly mounted on a housing 110. A player is to support his or her own body by grasping the right and left sticks 118.

The player stands on right and left steps 120*a* and 120*b* with both of his or her feet, these steps being mounted on the input board 120. With the right and left sticks 118 grasped by the player, he or she supports his or her own body and performs turns as in the actual skiing.

The turning action is accomplished by combining a horizontal swing action with an edging action in which the right and left steps 120a and 120b are inclined.

Figure 11:
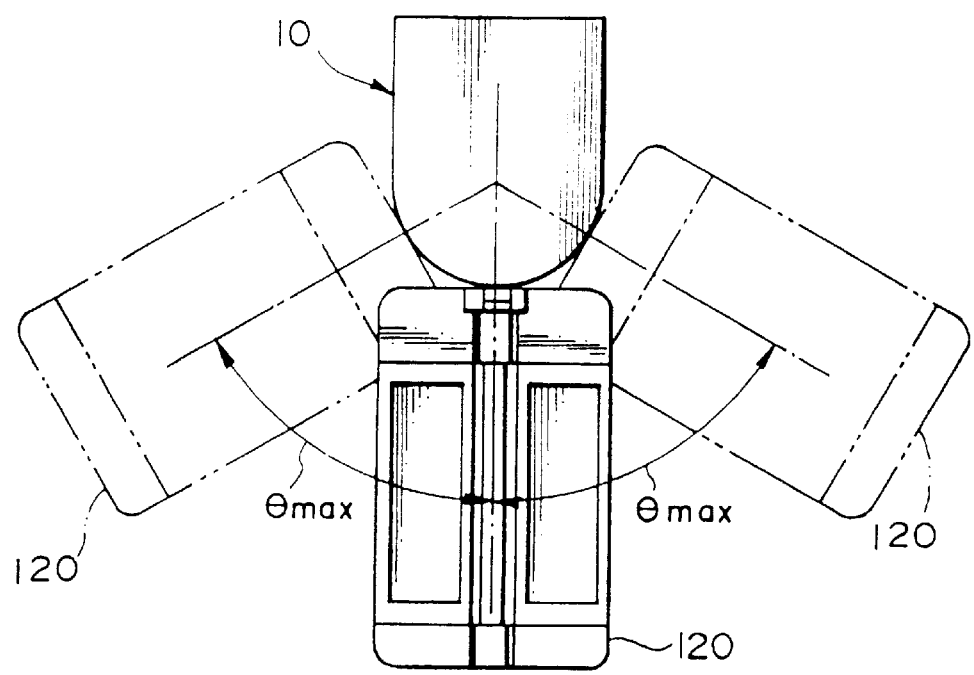
FIG. 11 illustrates the swinging motion of the simulator controlling device.

FIG. 11 illustrates the swing action on the input board 120. The input board 120 is located adjacent to the floor. The input board 120 is also pivotally mounted on the oscillator 10 for performing the swing action.

The swing action is accomplished about a rotating shaft 14 (see FIG. 1) for the input board within the maximum swing angle $\theta_{max}$ in either of the right or left direction from a reference position. The swing angle $\theta$ is zero at the reference position. The input board 120 shown by solid line in FIG. 11 is placed at the reference position. The reference position is defined herein such that the overall body of the player faces a screen 130 when the player gets on the input board 120.

The swing angle $\theta$ in the swing action is sensed by a swing sensor 18 (see FIG. 2) which is disposed in the oscillator 10. The swing sensor 18 comprises a variable revolving type resistor such that the swing angle $\theta$ of the input board 120 along the horizontal plane will be sensed as a resistance.

The input board 120 is forced to the reference position at which the swing angle $\theta$ is equal to zero (the position of the input board shown by solid line in FIG. 11). As the swing angle $\theta$ increases, the elastic force toward the reference position also increases. This can be accomplished by such means as will be described later. The player swings or oscillates the input board 120 in the right and left directions against the elastic force. Thus, the player can perform turns while feeling loads on both of his or her feet as in the actual skiing.

Distinctive Structure

The distinctive structure of this embodiment will now be described with reference to FIGS. 1 to 8B.

Figure 1:
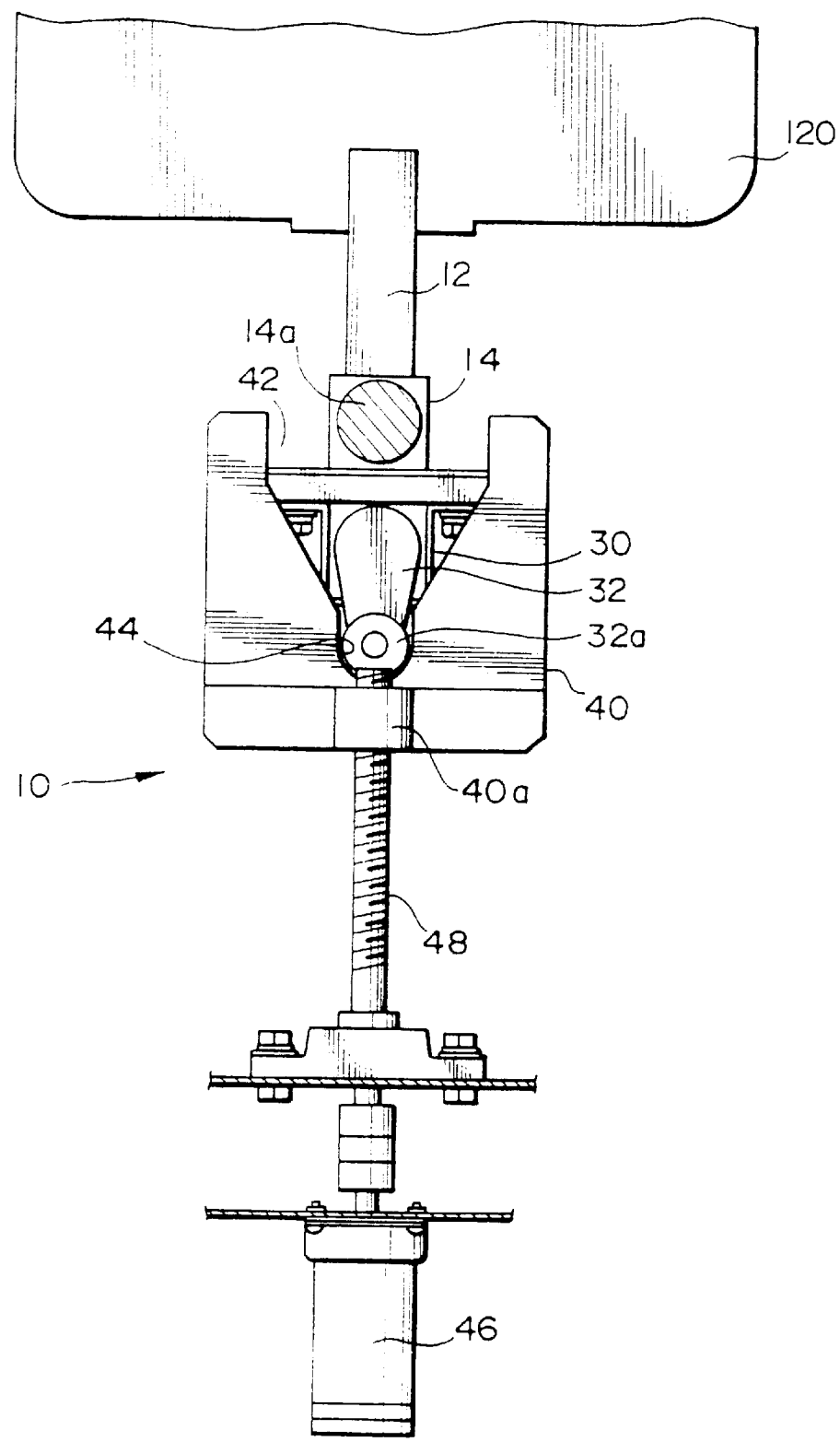
FIG. 1 is a plan view showing the internal structure of an oscillator.
Figure 2:
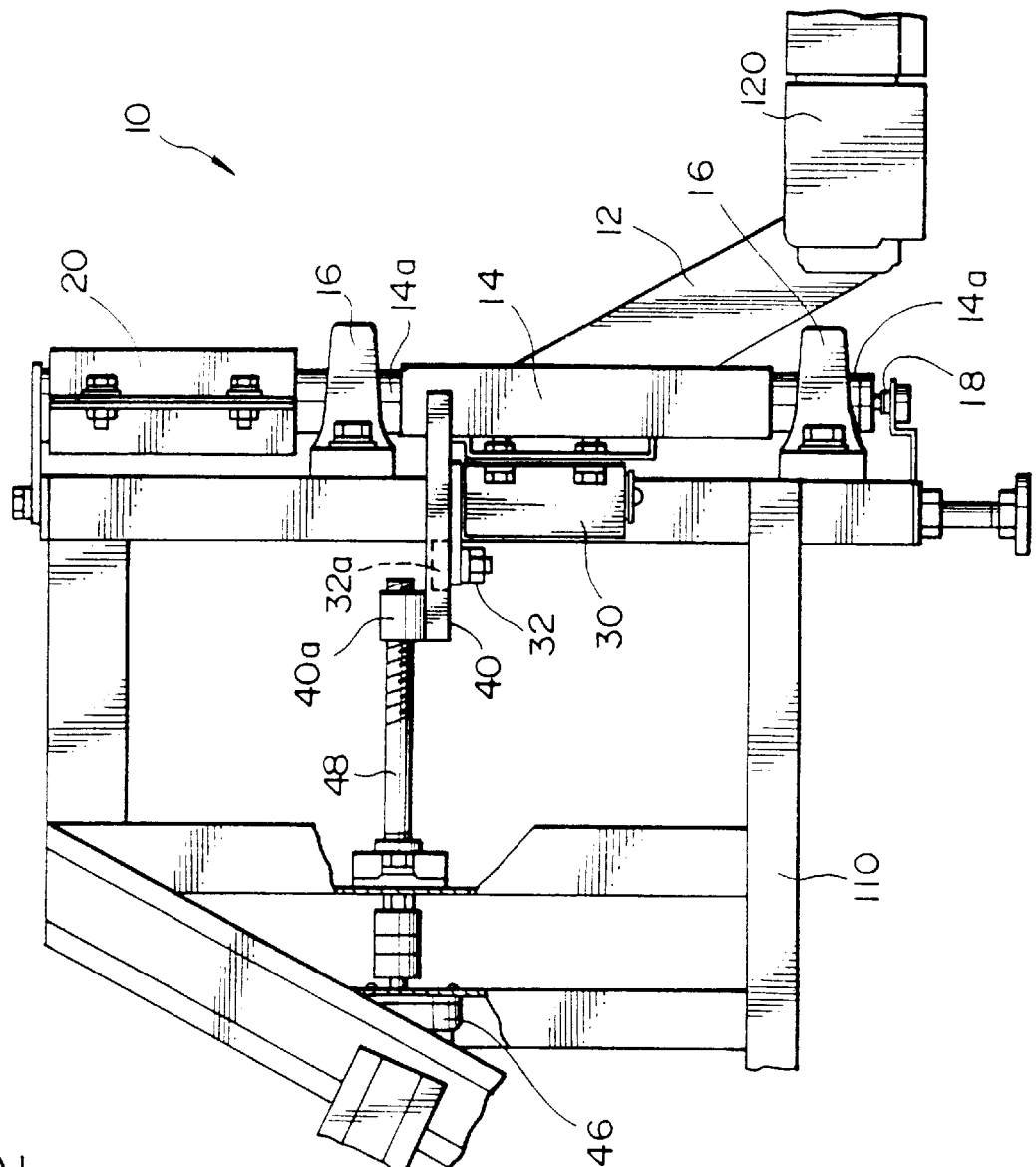
FIG. 2 is a side view of the oscillator of FIG. 1.

FIG. 1 is a plan view of the internal structure of the oscillator 10 while FIG. 2 is a side view thereof. In these figures, the input board 120 is restricted so that it will not oscillate.

Figure 3:
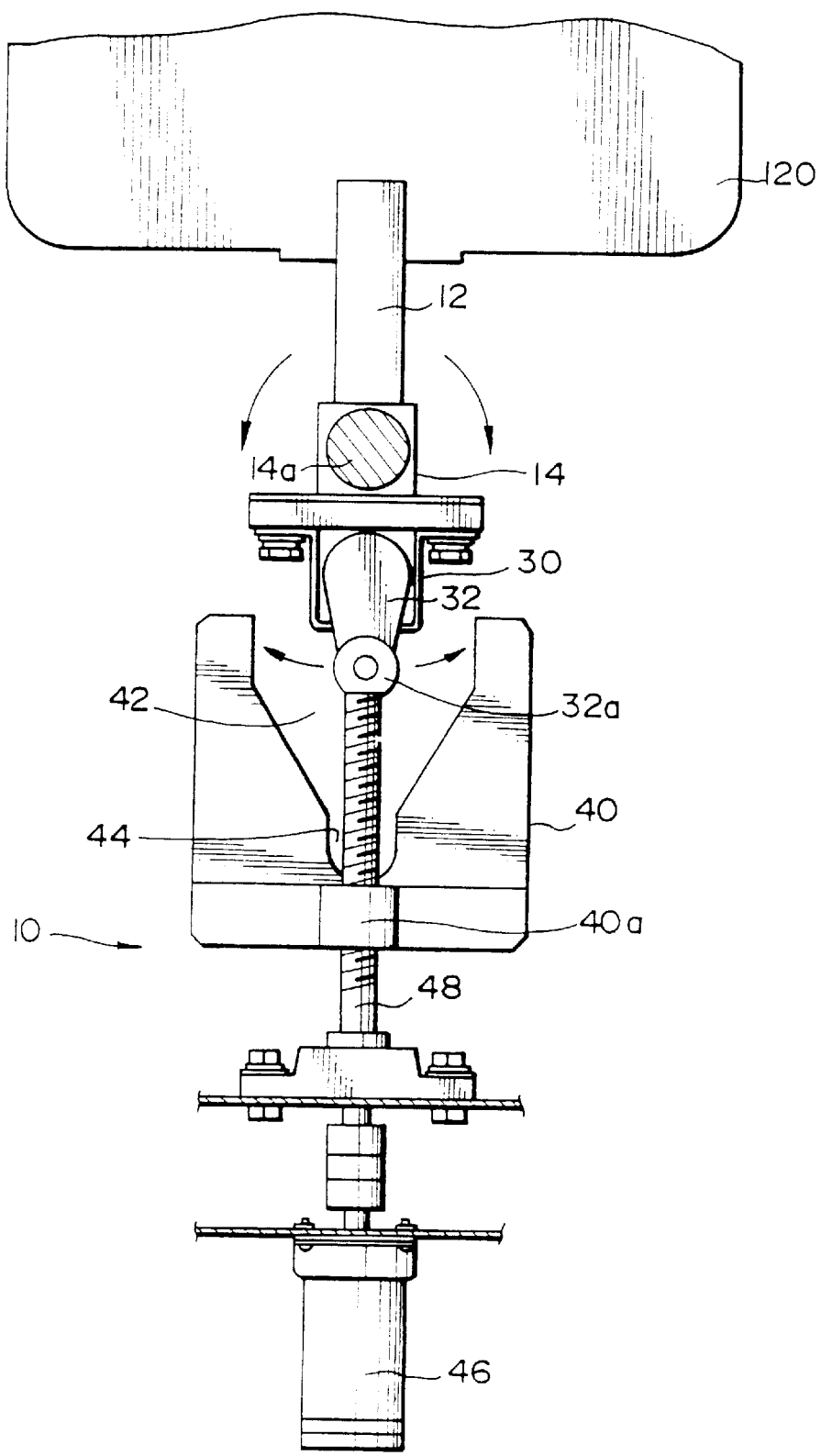
FIG. 3 is a plan view showing the movement of the oscillator of FIG. 1.
Figure 4:
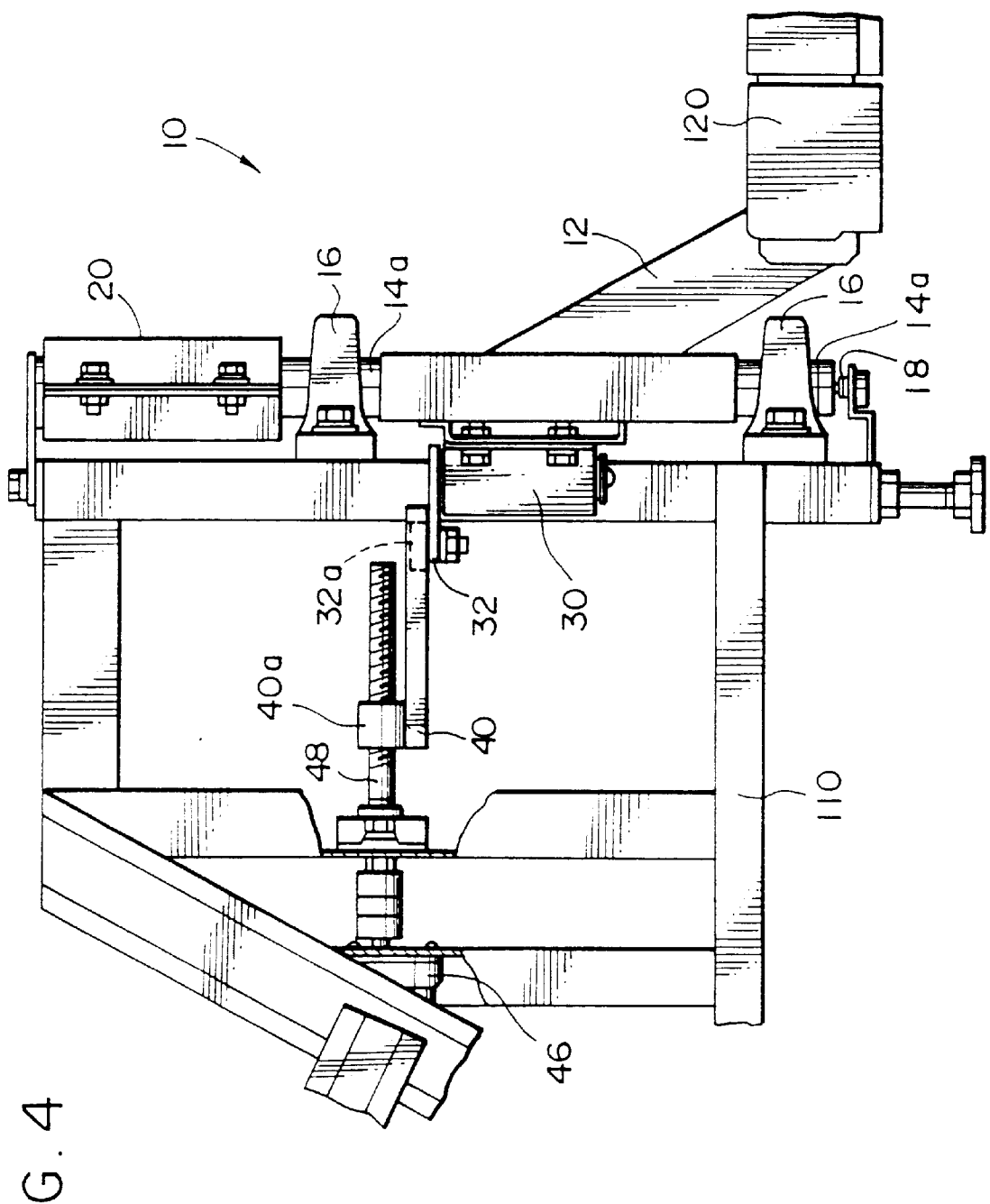
FIG. 4 is a side view of the oscillator of FIG. 3.

FIG. 3 is also a plan view of the internal structure of the oscillator 10, differing from FIGS. 1 in the input board 120 being freely swung or oscillated. FIG. 4 is a side view of FIG. 3.

As illustrated, the input board 120 is fixedly mounted on the rotating shaft 14 through an arm 12. The rotating shaft 14 is of square rod-shaped configuration and includes a cylindrical portion 14a formed on part of the rotating shaft 14. The cylindrical portion 14a is supported by a radial bearing 16 which is fixedly mounted on the housing 110. Thus, the input board 120 can be rotated or oscillated with the rotating shaft 14 (see FIGS. 5 and 6).

Figure 6:
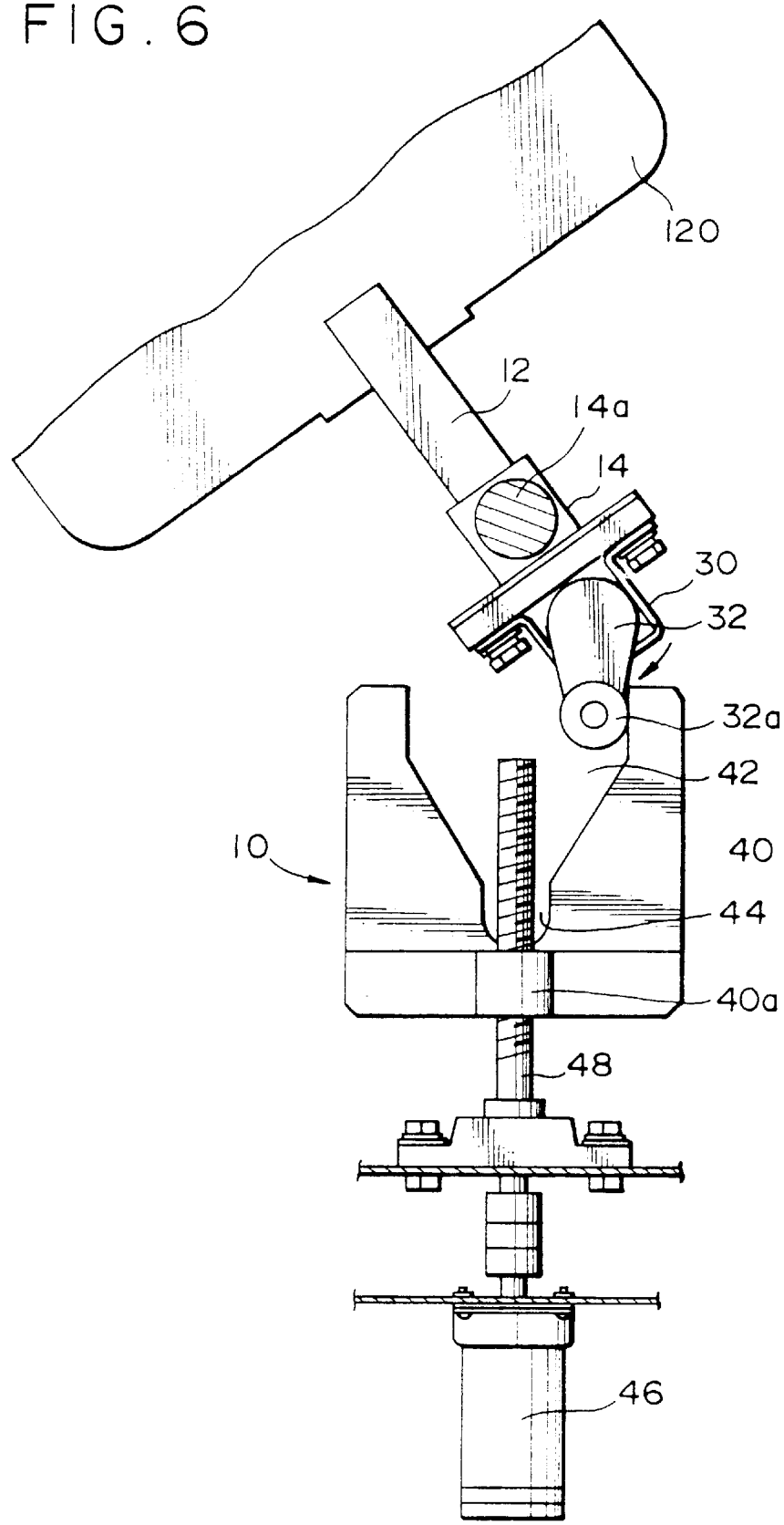
FIG. 6 is a plan view showing the movement of the oscillator.

As can be seen from FIG. 2 or 4, on the top of the rotating shaft 14 is mounted a reaction generating section 20 that forces the rotating shaft 14 to return it back to a given position. A reaction generating section 30 is mounted on the rotating shaft 14 at the opposite side to the input board 120. The reaction generating section 30 is adapted to force a stopped element 32 toward a given position. The stopped element 32 is of a plate-shaped arm that can be swung or oscillated as shown in FIG. 6. At the end of the stopped element 32 is rotatably mounted a roller 32a. The stopped element 32 can smoothly slide on the other member through the roller 32a. The details of the reaction generating sections 20 and 30 will be described later.

The stopped element 32 is disposed within an oscillation area 42 and an oscillation stopping area 44 which are defined by a stopper 40. More particularly, the roller 32a of the stopped element 32 is disposed within the oscillation stopping area 44.

The stopper 40 is of a plate-shaped configuration having a cut-out the width of which gradually increases toward the stopped element 32 to form the oscillation area 42. More particularly, the oscillation area 42 is cut out to have the maximum width adjacent to the end of the stopper 40 and to have the width gradually decreased from the end of the stopper 40. The oscillation stopping area 44 is formed in the stopper 40 at a position most remote from the stopped element 32. The oscillation stopping area 44 has its width sufficient to receive the roller 32a leaving some clearance. The stopper 40 can be moved toward or away from the stopped element 32. FIGS. 1 and 2 show the stopper 40 at a position in which it is most close to the stopped element 32. FIGS. 3 and 4 show the stopper 40 at a position in which it is most spaced away from the stopped element 32.

For such a purpose, the housing 110 includes a motor 46 mounted therein. On the top face of the stopper 40 is mounted an engagin portion 40a which has a female screw. A rotating rod 48 which has a male screw is rotatably driven by a motor 46. The stopper 40 can be moved forward and backward by the engagement of the female screw of the engaging portion 40a and the male screw of the rotating rod 48.

When the stopper 40 is in its most advanced position as shown in FIGS. 1 and 2, the roller 32a is fitted into the oscillation stopping area 44. As a result, the stopped element 32 cannot be oscillated with the input board 120. Eventually, the input board 120 will be stopped.

Figure 5:
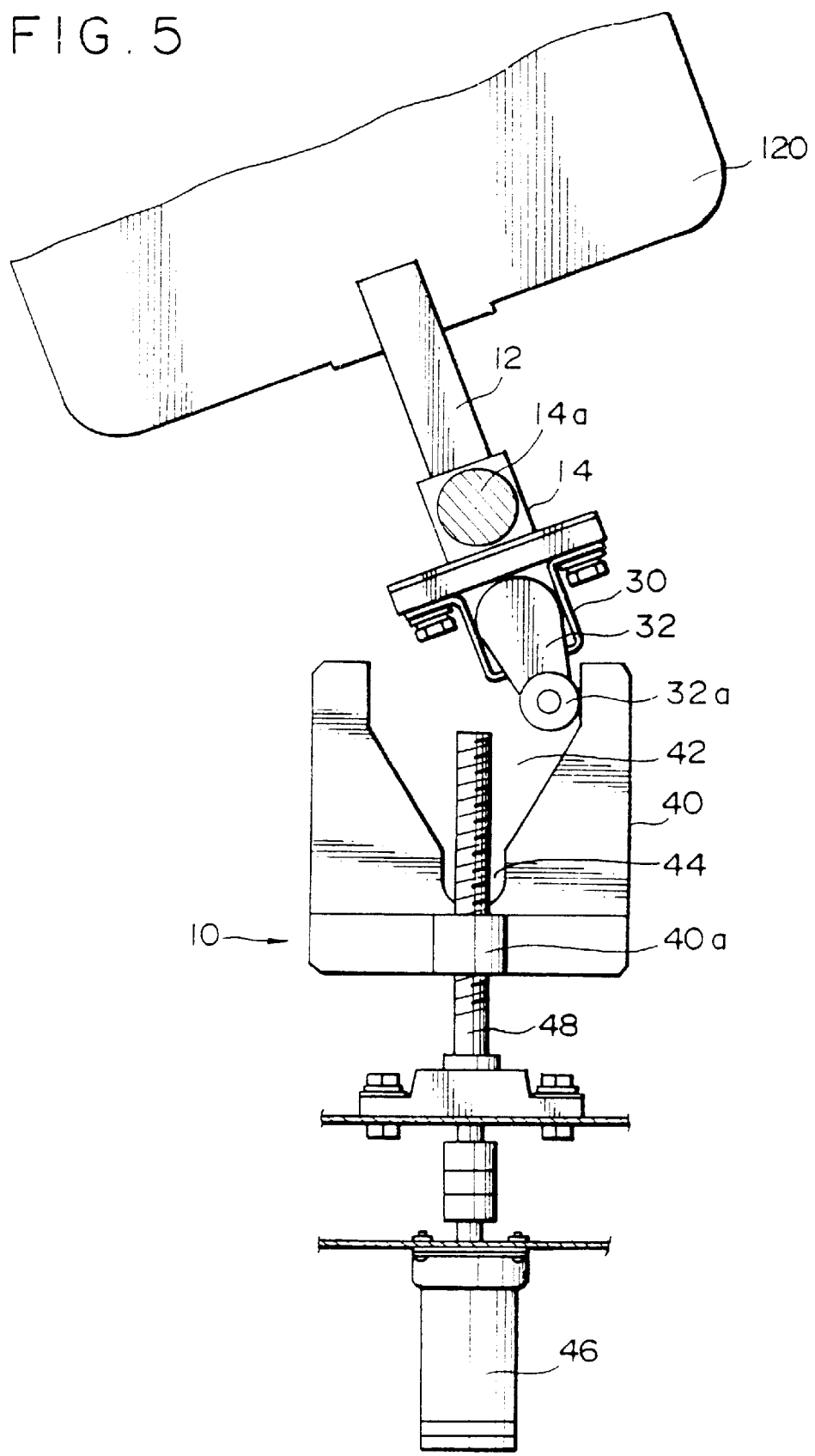
FIG. 5 is a plan view showing the movement of the oscillator.

On the other hand, when the stopper 40 is in its most retracted position as shown in FIGS. 3 and 4, the roller 32a can be freely moved within the oscillation area 42. Thus, the stopped element 32 can be oscillated with the input board 120 within this range. Eventually, the input board 120 can be oscillated, as shown in FIG. 5.

Since the stopper 40 can be smoothly moved by rotating the rotating rod 48, the stopper 40 can be positioned not only at the position most remoted from the stopped element 32 as shown in FIG. 3, but also at any middle position. Since the notch forming the oscillation area 42 has inclined side edges, the oscillating range of the stopped element 32 can be varied depending on the relative position between the stopper 40 and the stopped element 32.

When the stopper 40 is positioned at a certain place, a desired oscillating range can be provided. More particularly, the stopped element 32 and input board 120 will not be oscillated under such a condition that the roller 32a has been received in the oscillation stopping area 44 (see FIG. 1). As the stopper 40 is moving backward, the range within which the stopped element 32 and input board 120 can be oscillated gradually increases. In other words, this range gradually decreases as the stopper 40 is moving forward from its most retracted position (see FIG. 3). As the roller 32a has moved into the oscillation stopping area 44 (see FIG. 1), the stopped element 32 and input board 120 will be stopped in oscillation.

According to this embodiment, thus, the oscillation in the input board 120 is gradually stopped, rather than rapidly stopped. A player gets on the input board 120 while playing a game and gets off after the game is over. Therefore, The input board 120 is gradually stopped so that any violent impact will not be given and the player can get off the input board 120 easily.

If the input board 120 is further inclined from its position shown in FIG. 5, the stopped element 32 itself is also more or less inclined as shown in FIG. 6. The input board 120 can be further inclined more or less depending on the further inclination of the stopped element 32. Since a reaction force is given by the reaction generating portion 30 to the stopped element 32, however, it is required to incline the input board 120 through a force larger than that in the oscillation within the range shown in FIG. 5. The reaction generating portion 30 is basically similar to the reaction generating portion 20 (see FIGS. 2 and 4) on the rotating shaft 14. Therefore, the reaction generating portion 20 will be first described.

Figure 7A:
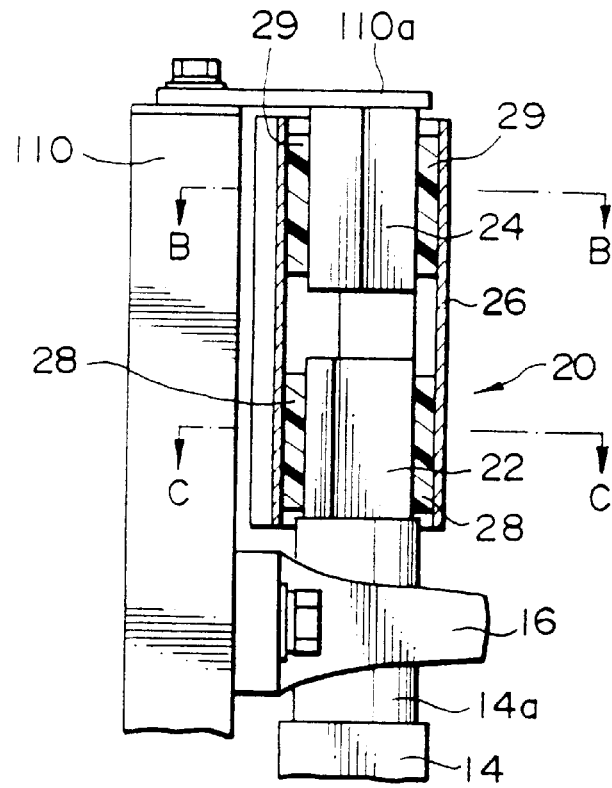
FIG. 7A is a longitudinal cross-section of a reaction generating section in the illustrated embodiment.
Figure 7B:
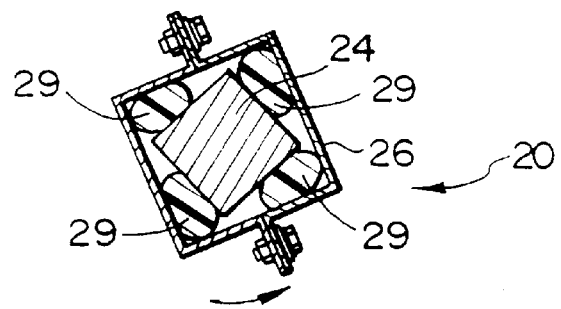
FIG. 7B is a cross-sectional view taken along a line B—B in FIG. 7A.
Figure 7C:
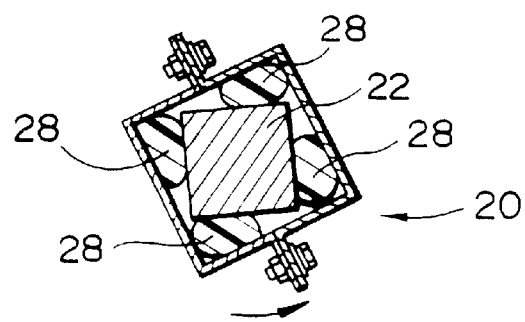
FIG. 7C is a cross-sectional view taken along a line C—C in FIG. 7A.

FIGS. 7A, 7B and 7C show the reaction generating portion 20. The input board 120 is inclined by the maximum angle (see FIG. 6).

FIG. 7A is a longitudinal cross-section of the reaction generating portion 20. FIG. 7B is a cross-sectional view taken along a line B—B in FIG. 7A. FIG. 7C is a cross-sectional view taken along a line C—C in FIG. 7A.

As shown, the reaction generating portion 20 comprises inner limiting portions 22 and 24, an outer limiting portion 26 and elastic portions 28 and 29.

Each of the inner limiting portions 22 or 24 is of square rod-shaped configuration. The inner limiting portions 22 is formed at the top of the rotating shaft 14. The inner limiting portion 24 is coaxially disposed above the inner limiting portion 24 with some distance.

The outer limiting portion 26 is a pipe having its square cross-section space where the inner limiting portions 22 and 24 is contained. More particularly, the outer limiting portion 26 is formed by a pair of pipe halves that are clamped with each other by means of bolts and nuts. The outer limiting portion 26 is positioned at a location where it has been rotated by 90 degrees relative to the inner limiting portions 22 and 24. In other words, the outer sides of the inner limiting portions 22 and 24 face the internal corners of the outer limiting portion 26 to form substantially triangular spaces therebetween.

Elastic portions 28 or 29 is pressed into the corresponding triangular space while being more or less compressed. The shape of the elastic portions 28 and 29 is selected such that the triangular configuration can be maintained through a reaction produced when the elastic portion is pressed into the triangular space. The elastic portions 28 and 29 are preferably formed of a elastic material having its particularly superior durability such as rubber or the like.

In such a manner, the elastic portions 28 are interposed under pressure between the outer limiting portion 26 and the inner limiting portion 22 while the elastic portions 29 are interposed under pressure between the outer limiting portion 26 and the inner limiting portion 24. The outer limiting portion 26 connects the inner limiting portions 22 and 24 through the elastic portions 28 and 29. In addition, the outer limiting portion 26 is not fixed to any other member.

In such an arrangement, the reaction generating portion 20 functions as follows. All the corners of the inner limiting portions 22 and 24 are directed toward the input board 120 when the latter is in its upright position as shown in FIG. 2.

As the input board 120 is gradually inclined, the rotating shaft 14 starts to rotate. Then the inner limiting portion 22 on the top of the rotating shaft 14 starts to rotate. Thus, the triangular spaces between the outer sides of the inner limiting portion 22 and the internal corners of the outer limiting portion 24 begin to be deformed. The elastic portions 28 disposed in these triangular spaces are to maintain their triangular configuration as described above. Thus, a reaction force against the oscillating force of the input board 120 will be given by the elastic portions 28.

As the input board 120 is further inclined, the elastic portions 28 are further compressed to increase the reaction force. The reaction force functions to rotate the outer limiting portion 26 to such a state as shown in FIGS. 7A–7C (see FIG. 6). In other words, the rotation of the rotating shaft 14 rotates the inner limiting portion 22 to compress the elastic portions 28. The compressed elastic portions 28 rotates the outer limiting portion 26 with its reaction force. The rotation of the outer limiting portion 26 causes the triangular spaces between the outer limiting portion 26 and the inner limiting portion 24 to be deformed, thereby compressing the elastic portions 29 in these triangular spaces.

In short, the reaction generating portion 20 provides two-stage reaction generating means. One stage of it is provided by the inner limiting portion 22, the elastic portions 28 and the outer limiting portion 26. The other stage of it is provided by the inner limiting portion 24, the elastic portions 29 and the outer limiting portion 26. The oscillation angle providing the reaction force is doubled by the two-stage reaction generating means in comparison with the reaction force by only one reaction generating means. More particularly, the first reaction force can be provided within a range of about 35 degrees by the inner limiting portions 22, the elastic portions 28 and the outer limiting portion 26. The second reaction force can be provided within a range of about 35 degrees by the inner limiting portion 24, the elastic portions 29 and the outer limiting portion 26. Thus, the total oscillation angle equal to about 70 degrees will be provided by the two-stage reaction forces.

Since one of the elastic portion 28 and 29 is compressed within an oscillation angle of about 35 degrees, the elastic portions are less damaged than the case where all the elastic portions are compressed within an oscillation angle of about 70 degrees. Since the reaction force is provided by a restoring force produced when the elastic portions 28 and 29 are compressed, the reaction force will increase as the oscillation angle increases. In the embodiment, the oscillation angle to compress one of the elastic portions is smaller, thereby providing a less variable reaction force. In other words, a relatively constant reaction force can be provided.

Figure 8A:
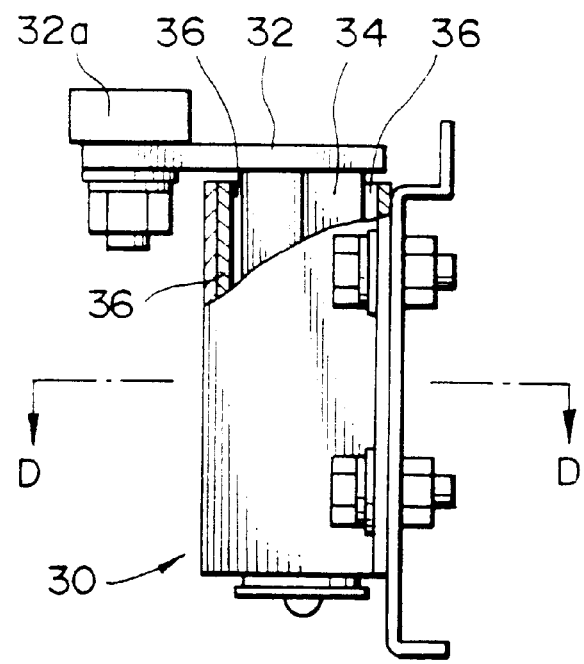
FIG. 8A is a longitudinal cross-section of another reaction generating section.
Figure 8B:
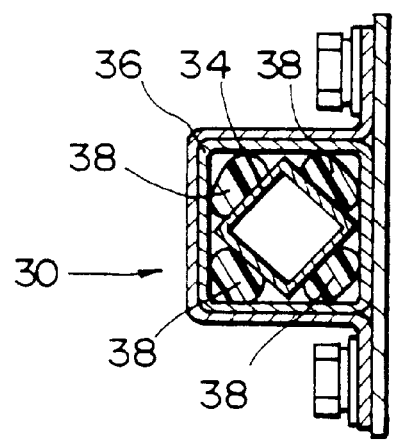
FIG. 8B is a cross-sectional view taken along a line D—D in FIG. 8A.

The reaction generating portion 30 will now be described. FIG. 8A is a partial side view of the reaction generating portion 30 while FIG. 8B is a cross-sectional view taken along a line D—D in FIG. 8A.

As described, the reaction generating portion 30 is mounted on the rotating shaft 14 and has a stopped element 32. The inclination of the stopped element 32 is limited by a stopper 40 to limit the oscillation of the input board 120 (see FIGS. 1 to 6).

The reaction generating portion 30 movably supports the stopped element 32 and provides a reaction force when the stopped element 32 is inclined. More particularly, a square pipe-shaped outer limiting portion 36 is fixedly mounted on the rotating shaft 14 in which an inner limiting portion 34 is disposed. The top end of the inner limiting portion 34 fixedly supports the stopped element 32. As shown in FIG. 8B, elastic portions 38 are disposed in the triangular spaces that are formed between the outer sides of the inner limiting portion 34 and the internal corners of the outer limiting portion 36.

In short, the reaction generating portion 30 is substantially similar to one stage of the aforementioned two-stage reaction generating portion 20, but will not be further described.

The stopped element 32 is thus swung or oscillated by the reaction force from the reaction generating portion 30. As an external force is applied to the input board 120 to incline it from such a state that the stopped element 32 is restricted by the stopper 40 as shown in FIG. 5, the stopped element 32 will be inclined to swing the input board 120 as shown in FIG. 6.

To shift the state of FIG. 5 to the state of FIG. 6, another force against the reaction force from the reaction generating portion 30 is required. When the stopped element 32 is inclined within the oscillation area 42, a reaction force is provided by the reaction generating portion 20. Since the reaction generating portion 30 will not provide any reaction force at this time, however, the input board 120 can be moved through a smaller outer force. When the input board 120 is to be further inclined from the position in which it is restricted by the stopper 40, an outer force against the reaction force from the reaction generating portion 30 is also required. By provision of the stopped element 32 through the reaction generating portion 30, thus, the input board 120 can be lightly swung or oscillated within a given rage. When the input board 120 is to be inclined beyond such a given range, a relatively large force must be exerted to the input board 120. The area in which such a relatively large force is required will be defined as an additional reaction area.

Thus, the input board 120 can be placed in three states. In the first state the reaction generating portion 20 provides a reaction force, but the reaction generating portion 30 does not provide a reaction force. In the second state the stopped element 32 can be inclined by a force against the reaction force from the reaction generating portion 30 while restricted by the stopper 40 (additional reaction area). In the third state the stopped element 32 is completely restricted and cannot be further moved. In addition, an impact produced when the oscillation of the stopped element 32 is limited by the stopper 40 can be absorbed by the reaction generating portion 30.

Since the roller 32a is received in the oscillation stopping area 44 under the state of FIG. 1, only the second and third states can be provided without the first state. More particularly, the additional reaction area becomes equal to the neutral position of the input board 120 since the roller 32a is located within the oscillation stopping area 44 of the minimum width. Therefore, the input board 120 is stabilized at the neutral position.

Other Structure

Figure 12A:
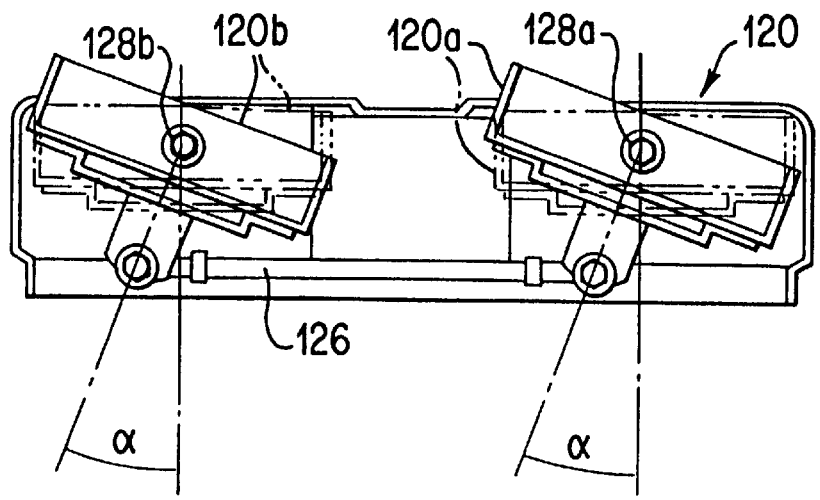
FIGS. 12A and 12B illustrate the edging motion of the steps in an input board of the simulator controlling device.
Figure 12B:
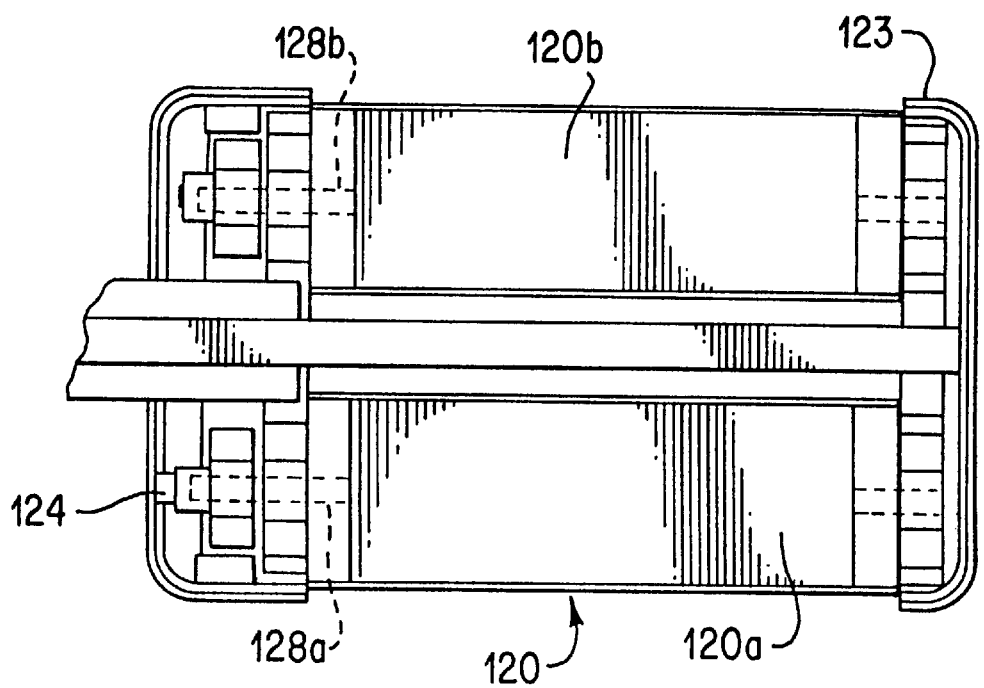

The other structure of this embodiment will be described below. FIGS. 12A and 12B show the detailed structure of the left and right steps 120a, 120b. Edging will be described with reference to FIGS. 12A and 12B.

The input board 120 of this embodiment comprises a pair of the left and right steps 120a, 120b, and a frame 123 which rotatably supports the left and right steps 120a, 120b through rotating shafts 128a and 128b, respectively. When the steps 120a and 120b are inclined by the player, he or she can perform an edging action.

The edging action is accomplished about the step rotating shafts 128a and 128b within the maximum inclination angle $\alpha_{max}$ from a reference position in which the inclination angle $\alpha$ is equal to zero in such a state as shown by a two dot chain line in FIG. 12A. The reference position can be defined as a position wherein the left and right steps 120a, 120b are positioned flat relative to the frame 123.

In this embodiment, a parallel link mechanism including a link 126 is applied to the left and right steps 120a, 120b. Thus, the left and right steps 120a, 120b can be interlocked to each other when they are inclinded. Therefore, the same inclination angle can be always maintained in both the left- and right steps 120a, 120b. This inclination angle is sensed by an edging sensor 124 which is located in the connecting portion between the step rotating shaft 128a and the frame 123. The edging sensor 124 is formed of a revolving type variable resistor which detects the inclination angle in the steps 120a and 120b as a resistance.

The left and right steps 120a, 120b are always forced toward the reference position in which the inclination angle $\alpha$ is equal to zero (a position in which the left and right steps 120a, 120b are shown by a two dot chain line in FIGS. 12A and 12B) through forcing means (not shown). As the inclination angle $\alpha$ increases, a restoring force toward the reference position increases. The player can perform the edging action while feeling loads on his or her feet as in the actual skiing, since the left and right steps 120a, 120b are swung or oscillated by the player against the aforementioned elastic force.

Figure 13A:
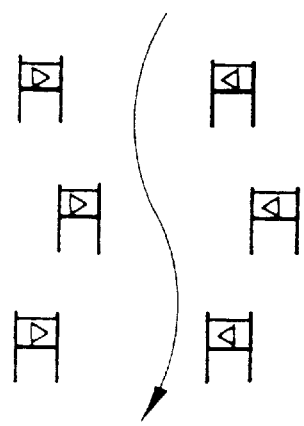
FIGS. 13A and 13B illustrate the locus of the player in the game.
Figure 13B:
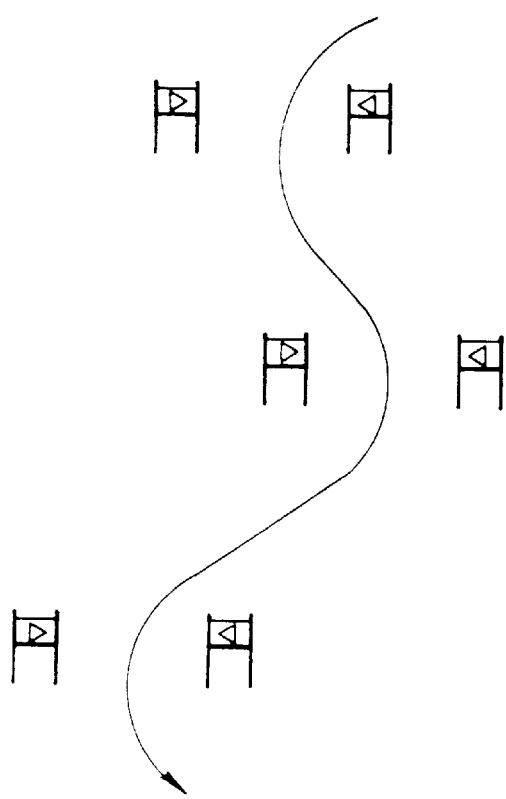

FIGS. 13A and 13B show the locus of the virtual skier moving in a virtual three-dimensional space.

In the actual skiing, the running state and locus of a skier are determined by turning motion of ski plates, topography and other natural conditions. Since the skier determines his or her running course by controlling the ski plates, the moving locus highly depends on the turning action of the ski plates.

In the ski game machine according to this embodiment, the turning action is provided by the horizontal swing action and the vertical edging action. These inputs provide the following functions to the locus of the moving skier.

For example, if the virtual skier inclines his or her ski plates through a small angle, the locus thereof draws such a gentler curve as shown in FIG. 13A, resulting in a smaller deceleration. If the virtual skier inclines the ski plates through a larger angle, the locus thereof draws such a sharper curve as shown in FIG. 13B, resulting in a larger deceleration.

When the player wants the virtual skier to perform a turn and if the left and right steps 120a, 120b in the input board 120 are used to make an edging action, the game is produced such that the edging action influences the locus and speed of the virtual skier.

More particularly, as the edging angle increases, the curve drawn by the locus of the virtual skier is more sharpened and the deceleration decreases. Only when the player appropriately combines the swinging action with the edging action in the input board 120, the virtual skier can perform his or her quick passage through a desired course without running out of the course. This can provide a feel more similar to that of the actual skiing.

The ski game machine according to this embodiment will now be briefly described. When the player gets on the input board 120, he or she first throws a coin into a coin throwing portion (not shown) and then depresses selection buttons 112, 114 and a decision button 116 to select a game mode and a course.

This embodiment provides two game modes, a race mode and a time attack mode. When the race mode is selected, a competitive game in which the virtual skier competes with four computer skiers will be played. If the player selects the time attack mode, only the virtual skier controlled by the player will play the game to obtain the shortest time, rather than competition with the computer skiers.

Furthermore, this embodiment provides three courses, junior, middle and senior.

When a race mode and a course are selected by the player, the game starts with a game scene 300 on a display 130.

Figure 14:
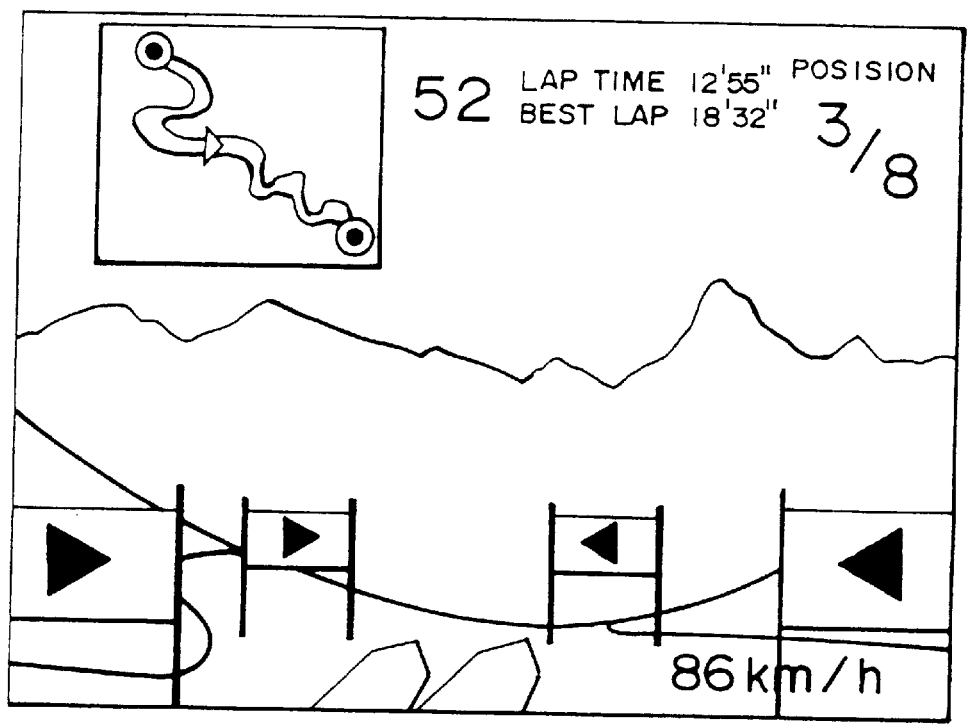
FIG. 14 illustrates the details of a game scene.
Figure 16A:
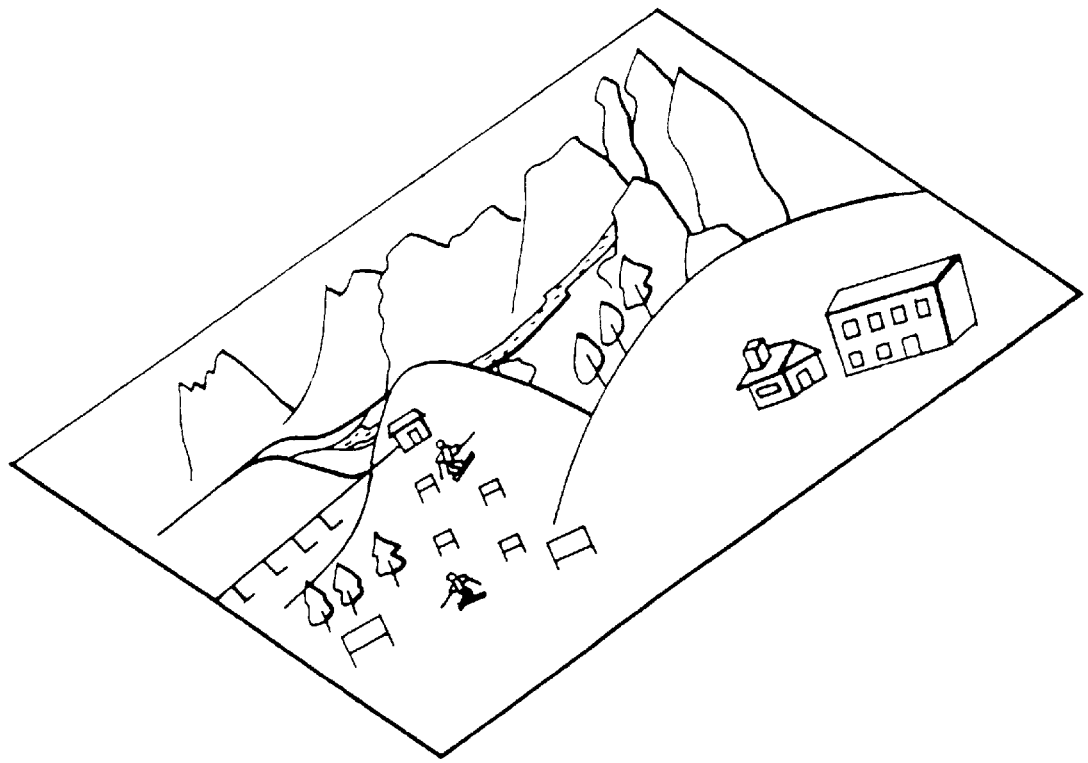
FIGS. 16A and 16B illustrate three-dimensional game scenes.

FIG. 14 shows the details of such a game scene in this embodiment. The game scene 300 includes a scene viewed by the virtual skier in his or her front in a preset three-dimensional game space. Such a scene is rirtual three-dimentional one corresponding to the course selected by the player. FIG. 16A exemplifies a scene in a selected course.

Information relating to the courses is stored, as divided map information, in a map information storage section of a game computation section 400 as will be described. Information necessary to form the images of the course is stored in an object image information storage section 260 of an image synthesis section 200 which will be also described. Based on the information, the scene viewed by the virtual skier in his or her front is computed and displayed.

Figure 15:
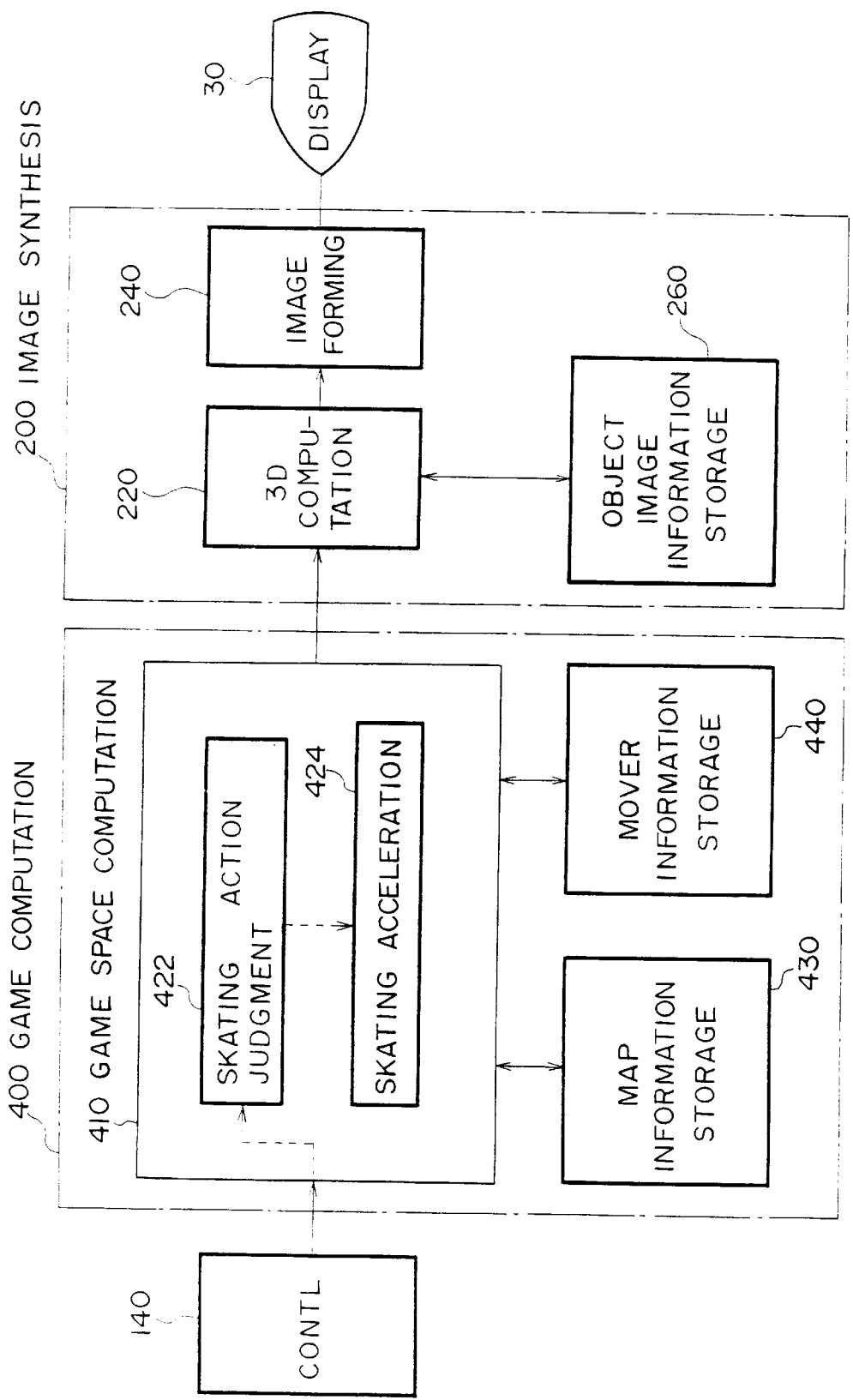
FIG. 15 is a functional block diagram of the simulator controlling device.

FIG. 15 is a functional block diagram of an arcade ski game machine according to this embodiment.

The arcade ski game machine comprises a player's control section 140, a game computation section 400, an image synthesis section 200 and a display 130.

The player's control section 140 includes an input board 120, selection buttons 112, 114, a decision button 116 shown in FIG. 9. The player's control section 140 further includes a swing sensor 18 and an edging sensor 124 for sensing a turn motion of the input board 120 as swing and inclination angles. The detection signal and other control signals are then inputted into the game computation section 400.

The game computation section 400 comprises a game space computation section 410, a map information storage section 430 and a mover information storage section 440. The game computation section 400 performs various computation for the game on the basis of the input signals from the control section 140 and a preset game program. The resulting data are then outputted toward the image synthesis section 200 for forming an image.

The preset game program is stored in a storage section (not shown) in the game space computation section 410. The game space computation section 410 computes the positional coordinates of the virtual skier controlled by the player on the basis of the game program, the control signals from the control section 140 and the skier information read out from the mover information storage section 440. The game space computation section 410 also computes the positional coordinates of other virtual skiers on the basis of the game program and the mover information read out from the mover information storage section 440. Thus, a three-dimensional game space will be formed on the basis of the positional coordinates of the virtual skier controlled by the player and other virtual skiers as well as the map information read out from the map information storage section 430.

More particularly, the game scene is supplied to the display at each time of 1/60 seconds. The game computation section 400 sets a three-dimensional game space reflecting 1/60 seconds variable states according to the following manner.

Information relating to the courses along which the player's skier moves is stored in the map information storage section 430 as divided map information about the plane coordinates of each point and the altitude of that point. The present position of the player's skier is stored in the mover information storage section 440 as the mover information in the three-dimensional coordinates. As the game starts, a start position is decided depending on the course selected by the player. The coordinates of that start position in the three-dimensional space are initially set in the mover information storage section 440 as the present position of the player's skier. The infomation of the position of the player's skier in the mover information strage section 440 subsequently updated depending on the computation result by the game space computation section 410 every 1/60 seconds.

The game space computation section 410 reads out the present position of the player's skier from the mover information storage section 440. The game space computation section 410 further computes the variable position of the player's skier moving in the virtual three-dimensional space, based on the control signals from the control 140 through the turning action made by the player and the infomation of the topography and other natural conditions. Information of a natural condition such as wind or the like is formed according to algorithm preset in the game program so that the natural condition can influence the moving action of the player's skier.

In such a manner, this embodiment computes the state where the player's skier is going on skis in a given three-dimensional game space as shown in FIG. 16A. The results are outputted toward the image synthesis section 200.

Since images are supplied to the display every 1/60 seconds, the game space computation section 410 performs the aforementioned computation every 1/60 seconds and outputs the result toward the image synthesis section 200.

The image synthesis section 200 forms artificial three-dimensional and course map images actually viewed by the virtual skier according to the result from the game computation section 400. These images are then displayed on the display 130. The image synthesis section 200 comprises a three-dimensional computation section 220, an image forming section 240 and an object image information storage section 260.

The object image information storage section 260 has stored image information relating to the movers such as the skiers, snowed surfaces, hills, trees, rivers, buildings and others.

In such a case, each of the image information is represented by a plurality of polygons.

The three-dimensional computation section 220 reads out the image infomation corresponding to the input data (including the mover information and divided map information) from the object image information storage section 260. The read image information set the game space as a set of polygons. The three-dimensional computation section 220 also performs other processing such as clipping for removing data out of the visual field, perspective projection conversion into a screen coordinate system, sorting and others. The processed data are then outputted toward the image forming section 240.

Figure 16B:
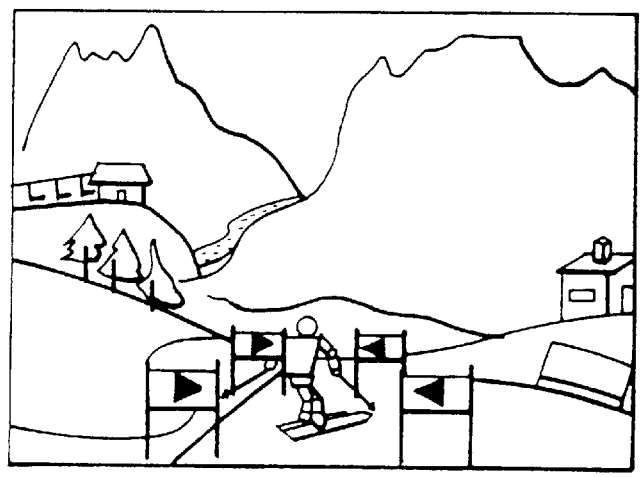

The image forming section 240 forms image information visible to the player based on the inputted data. More particularly, the data inputted from the three-dimensional computation section 220 to the image forming section 240 are represented as image information formed by polygon vertex information and other information. Therefore, the image forming section 240 forms image information of all the dots in each polygon based on the polygon vertex information and other information. The processed data are then outputted toward the display 130 in which such a virtual three-dimensional game image as shown in FIG. 16B will be formed.

The image forming section 240 may form an image through a technique known as a texture mapping in which the image information of all the dots in each polygon has been stored in any suitable storage means such as ROM as texture information. The texture information is then read out from the ROM and mapped onto the polygon using texture coordinates given to each vertex of each polygon as an address.

As the game proceeds while the player makes various actions such as turns and others through the input board 120, a state as if the player goes on skis in the virtual three-dimensional game space 500 can be simulated.

As the game is started in the arcade ski game machine according to this embodiment, the player can freely slide in the virtual three-dimensional game space 500 shown in FIG. 16A and can also compete with the other skiers.

Normally, a skier will not stop as long as he or she goes from a higher place to a lower place. If he or she falls or goes out of the courset, he or she may stop. If an acceleration can be consciously attained by performing the skating input with both the feet of the player as in the actual skiing, the ski game machine will be improved in reality. In the prior art game machines of such a type, however, the input means included an input board that can be simultaneously actuated by both the feet of the player. This only permits the turning action in the skiing. Therefore, the prior art could not provide a skating action that is performed by both the feet of the player.

The game machine of this embodiment comprises a skating action judgment section 422 in the game space computation section 410. The skating action judgment section 422 judges that the skating action is being performed only when the turning action of the input board 120 fulfills a preset requirement.

In such an arrangement, the input board 120 used to performing the normal turn input can be also used to make the skating input through the player's feet without any modification. This can provide a ski game, snow board game or skate board game which is improved in reality.

More particularly, the skating action judgment section 422 judges that the skating action is being performed only when four or more swings are detected by the swing sensor, each swing having a swing angle equal to or more than 70% of the maximum angle (70 degrees) and an interval between each swing being equal to or less than 0.8 seconds. Thus, the skating turn can be clearly distinguished from the normal turning action.

Figure 17A:
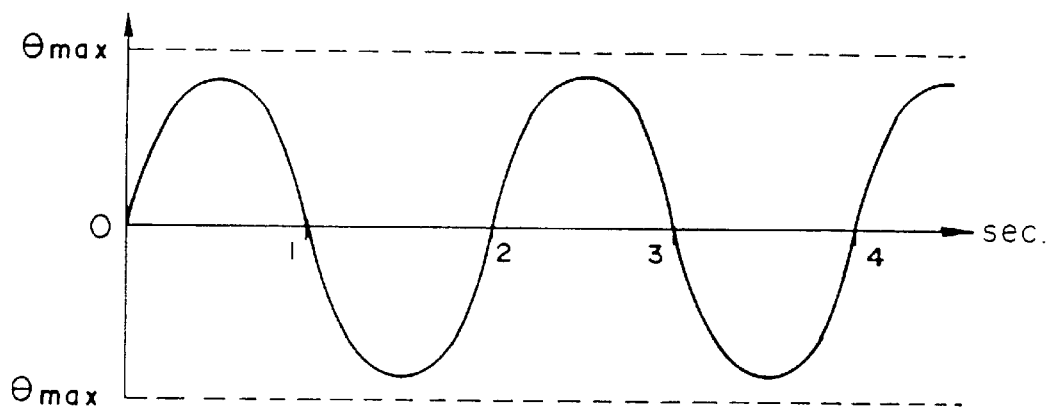
FIGS. 17A, 17B and 17C illustrate analog wave forms based on swing angles which are sensed by a swing sensor.
Figure 17B:
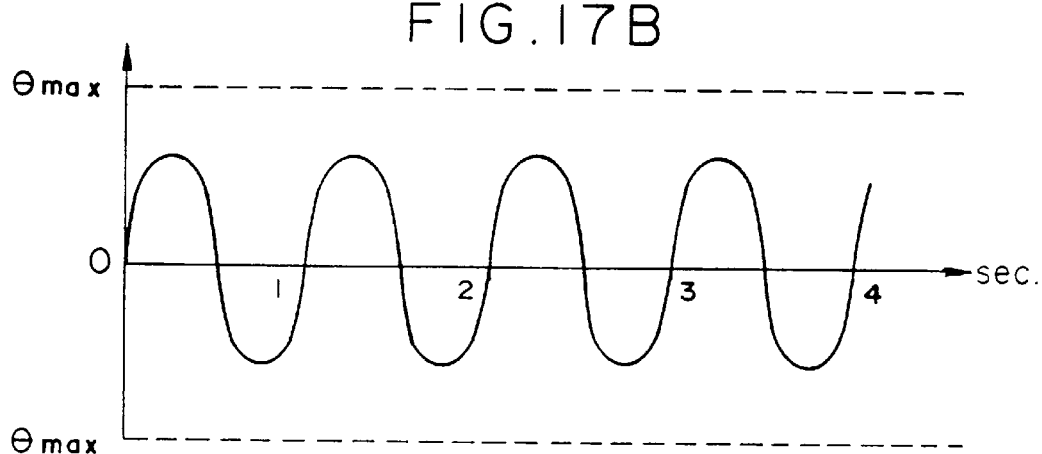
Figure 17C:
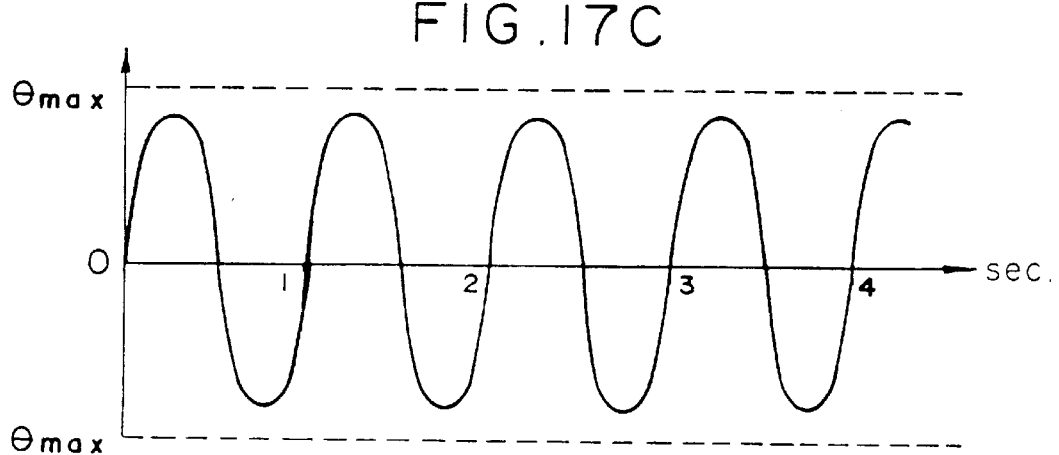

FIGS. 17A, 17B and 17C are schematic analog diagrams of the swing angle θ detected by the swing sensor. The horizontal axis represents time. The vertical axis represents the magnitude of the swing angle θ relative to the reference position 0. The swing angle θ measured from the reference position in the left direction is positive while the swing angle θ measured from the reference position in the right direction is negative. FIG. 17A is an analog wave form detected by the sensor 122 when each swing angle θ is 90% of the maximum (70 degrees) and an interval between each swing is one second. FIG. 17B is an analog wave form detected by the sensor 122 when each swing angle θ is 60% of the maximum (70 degrees) and an interval between each swing is 0.5 seconds. FIG. 17C is an analog wave form detected by the sensor 122 when each swing angle θ is 90% of the maximum (70 degrees) and an interval between each swing is 0.5 seconds.

The skating action judgment section 422 judges that the skating action is being performed when such an analog wave form as shown in FIG. 17C is detected.

The game machine of this embodiment further comprises a skating acceleration section 424 for consciously accelerating the player's skier based on the skating action.

The skating acceleration section 424 is responsive to the result of the skating action judgment section 422 and also the state of the player's skier in the virtual three-dimensional space for accelerating the player's skier in the virtual three-dimensional game space.

The skating acceleration section 424 judges whether or not the player's skier should be accelerated, based on the result of the skating action judgment section 422 and also the speed of the player's skier. This is because the skating action is not almost basically performed by the skier when he or she skis at a high speed and because it is preferred that the swinging action of the player in such a case is treated as the turning action, rather than the skating action.

When a skating action is sensed by the skating action judgment section 422, the skating acceleration section 424 judges it a skating action and accelerates the player's skier in the virtual three-dimensional game space if the speed of the player's skier is less than a predetermined level. If the speed of the player's skier in the virtual three-dimensional game space is higher than the predetermined level, the skating acceleration section 424 judges the detected skating action as a turning action and does not accelerate the player's skier. The predetermined level is set 80 km/h in this embodiment.

In this embodiment, the skating acceleration section 424 increases the present acceleration by a given amount while the skating action is continued. In other words, the acceleration computed by the game computation section 400 is controlled to be increased by a given amount during the skating action.

Figure 18:
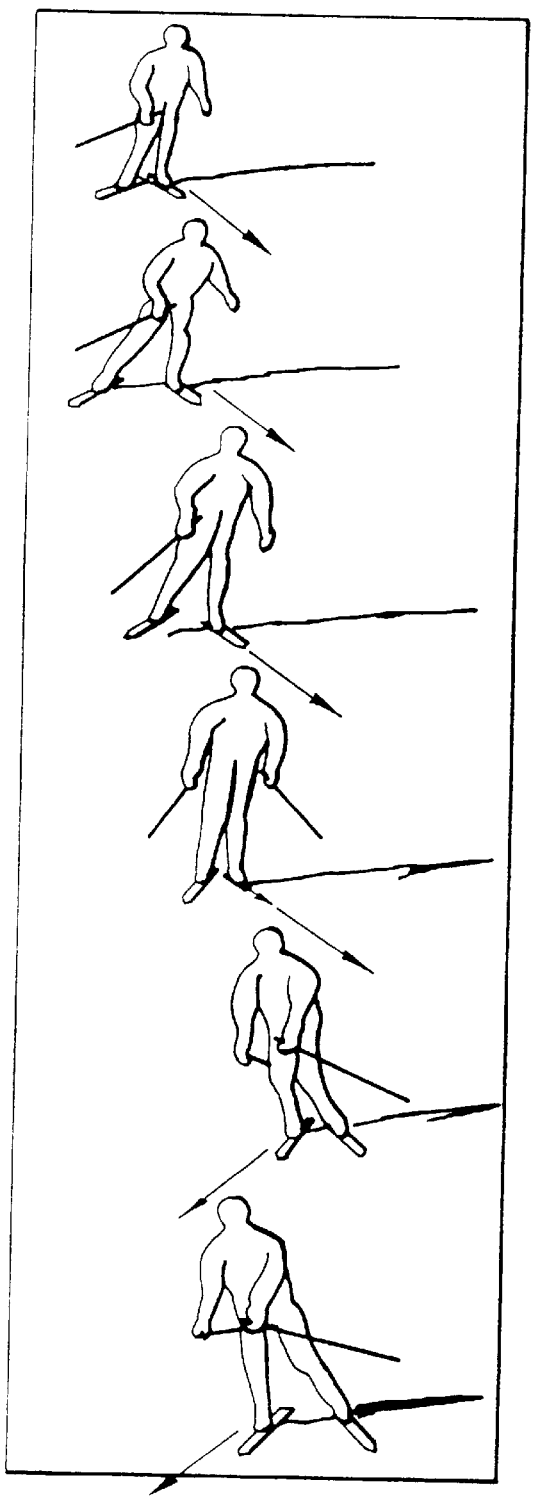
FIG. 18 illustrates a game scene in which the player is performing a skating action.

FIG. 18 continuously shows the states of the player's skier in the game space when the acceleration is being performed during the skating action.

If the speed of the player's skier is equal to or higher than a given speed, the skating acceleration section 424 judges that the player is performing the turning action, even if the aforementioned skating action is made by the player.

In this embodiment, the conscious acceleration by the player's skating action can be accomplished without damage of the reality only by operating the input board 120.

The invention is not limited to the illustrated and described embodiment, but may be applied to any one of various modified and changed forms.

Modifications of the Distinctive Structure

Figure 19:
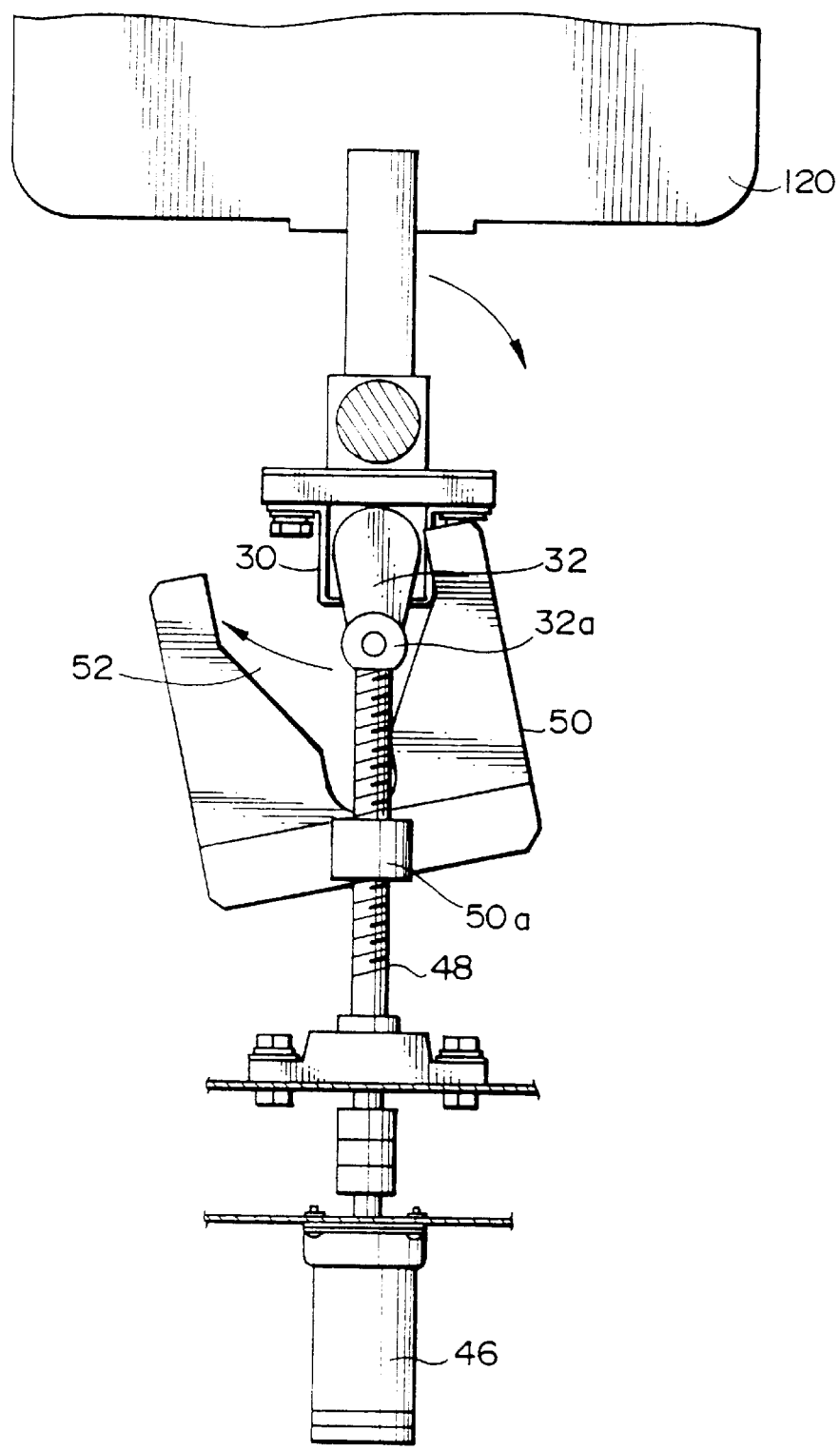
FIG. 19 illustrates a modified form of the illustrated embodiment.

The form shown in FIG. 1 can be modified into such a form as shown in FIG. 19. Referring to FIG. 19, a stopper 50 is provided so that it can be rotated in the swinging direction of the stopped element 32 about a engaging portion 50*a* which is engaged with a rotating rod 48. Thus, the position of an oscillation area 52 in which the stopped element 32 is permitted to be swung only within a given range can be offset. More particularly, the input board 120 can be narrowly inclined in a counterclockwise direction in FIG. 19, but can be widely inclined in a clockwise direction. To rotate the stopper 50, the engaging portion 50*a* may be formed separately of the stopper 50 and angularly adjusted by screw means or the like.

Figure 20:
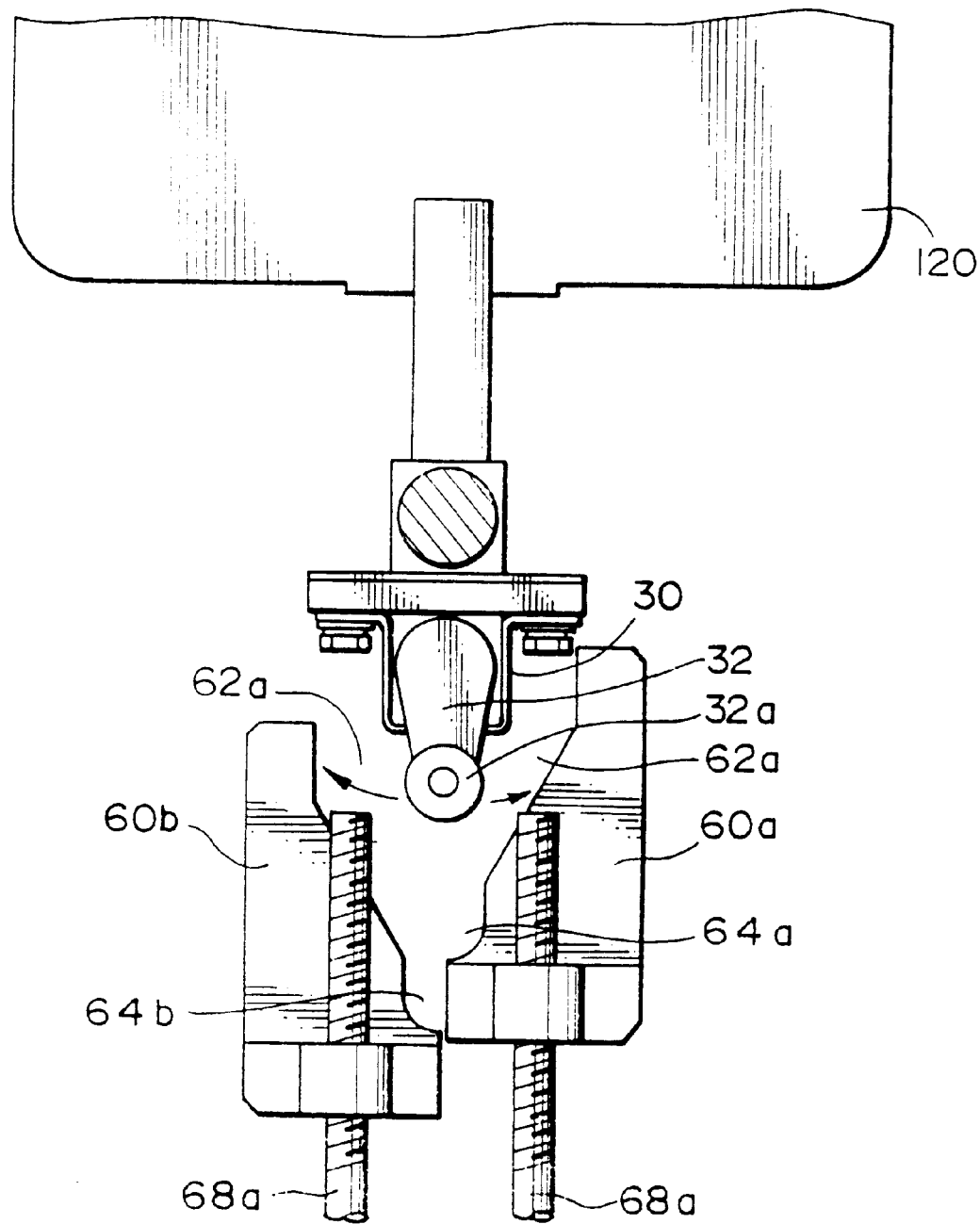
FIG. 20 illustrates another modified form of the illustrated embodiment.

FIG. 20 shows another modified form which comprises two divided stoppers 60*a* and 60*b*. Each of the stoppers 60*a* and 60*b* is driven by a rotating rod 68*a* or 68*b*. One of the stoppers 68*a* or 68*b* is adapted to define one end of a range in which the stopped element 32 can be swung while the other stopper 68*b* or 68*a* is adapted to define the other end of such a range. Thus, the stopped element 32 can be swung or oscillated from the neutral position in one and the other directions with different angles. When the stopped element 32 is to be stopped, however, it is required that the oscillation stopping areas 64a and 64b are arranged so that the roller 32a can be received by both of them.

Figure 21:
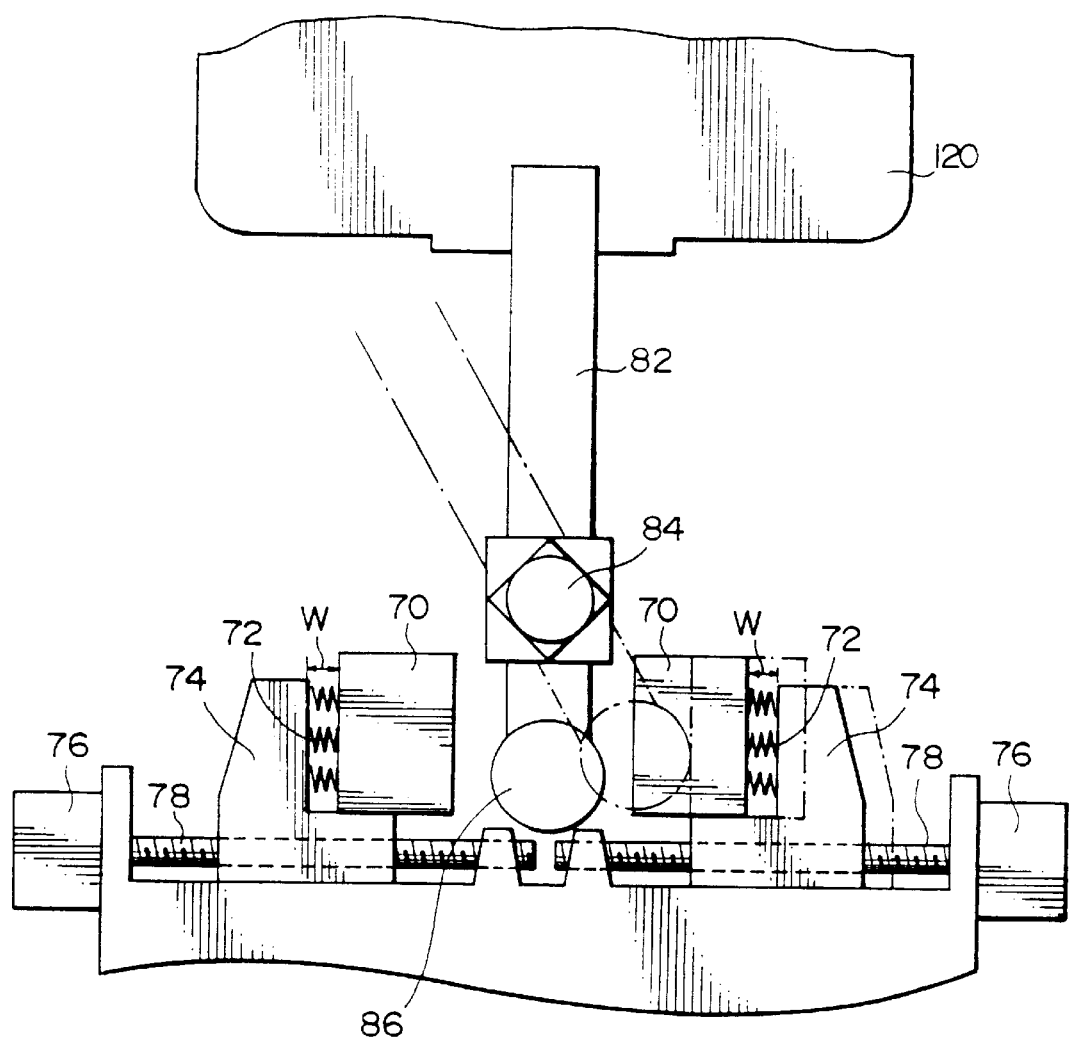
FIG. 21 illustrates still another modified form of the illustrated embodiment.

FIG. 21 shows still another modified form which comprises an arm 82 supporting the input board 120. At end of the arm 82 is provided a stopped element 86. The arm 82 can be rotated about a rotating shaft 84. The rotating shaft 84 is forced to return back to a given position through reaction generating means as in the previously described embodiment. The stopped element 86 is located between a pair of stoppers 70 which restrict the oscillation of the stopped element 86.

More particularly, each of the stoppers 70 is mounted on mounting portions 74 through a spring 72. Thus, each stopper 70 can exert a reaction force larger than the reaction force provided by the rotating shaft 84 to the stopped element 86 within a width range W in which the corresponding spring 72 is elastically deformed. Therefore, an impact to the stopper 70 can be absorbed when the oscillation of the stopped element 86 is restricted.

Each of the mounting portions 74 is engaged with a screw formed on the corresponding rotating rod 78 driven by a motor 76. As the rotating rods 78 are rotated, the mounting portions 74 can be moved. When the spacing between the mounting portions 74 is increased or decreased, the oscillation area of the stopped element 86 can be increased or decreased. When the oscillation area is decreased to its minimum level, the stopped element 86 can be completely restricted to make the input board 120 immobile at the neutral position.

Although the embodiments have been described as to the three-dimensional ski game machine, the invention is not limited to such a game machine, but may be similarly applied to any other simulator adapted to perform a snow board, skate board, surfing board or the like.

Although the swinging member has been described as an input board which can be simultaneously swung by both the feet of the player, the invention can be similarly applied to two interlocking input boards which can be swung by the feet of the player through a parallel linkage. Alternatively, such two input boards may be independently swung by the respective feet of the player while at the same time first and second elastic means may be provided to generate independent reactions to the respective input boards.

What is claimed is:

1. A sliding simulator comprising:
    a swinging member, said swinging member being swung right and left by a player standing thereon;
    a swing sensor for sensing swing movement of said swinging member;
    an image generating unit for generating an image in response to a signal sensed by said swing sensor; and
    a display for displaying said image.

2. A game apparatus comprising said sliding simulator of claim 1 for playing a skiing game.

3. The sliding simulator of claim 1, wherein said image is a three-dimensional image.

4. A game apparatus comprising said sliding simulator of claim 3 for playing a skiing game.

5. The sliding simulator of claim 1, wherein said swinging member has a pair of steps and an edging sensor, each of said steps being designed for said player's standing thereon with each of the player's feet, each of said steps being rotatably supported along an axis extending behind and in front of said player, said edging sensor sensing an inclination angle of said steps, wherein a signal sensed by said edging sensor is inputted into said image generating unit and used as part of information for generating said image.

6. The sliding simulator of claim 5, wherein said edging sensor comprises a rotating type variable resistor.

7. The sliding simulator of claim 5, wherein said image is a three-dimensional image.

8. A game apparatus comprising said sliding simulator of claim 7 for playing a skiing game.

9. The sliding simulator of claim 5, further comprising a support means grasped by said player to support the player's body with the player's hands.

10. The sliding simulator of claim 9, wherein said image is a three-dimensional image.

11. A game apparatus comprising said sliding simulator of claim 10 for playing a skiing game.

12. The sliding simulator of claim 5, wherein said steps are interlocked to be made parallel.

13. The sliding simulator of claim 12, wherein said image is a three-dimensional image.

14. A game apparatus comprising said sliding simulator of claim 13 for playing a skiing game.

15. The sliding simulator of claim 12, further comprising a support means grasped by said player to support the player's body with the player's hands.

16. A game apparatus comprising said sliding simulator of claim 15 for playing a skiing game.

17. The sliding simulator of claim 15, wherein said image is a three-dimensional image.

18. A game apparatus comprising said sliding simulator of claim 17 for playing a skiing game.

19. The sliding simulator of claim 1, further comprising a support means grasped by said player to support the player's body with the player's hands.

20. The sliding simulator of claim 19, wherein said image is a three-dimensional image.

21. A game apparatus comprising said sliding simulator of claim 20 for playing a skiing game.

* * * * *